Dec. 28, 1926.
D. P. OWENS
PISTON MOUNTING
Filed Sept. 25, 1925 2 Sheets-Sheet 1
1,612,047
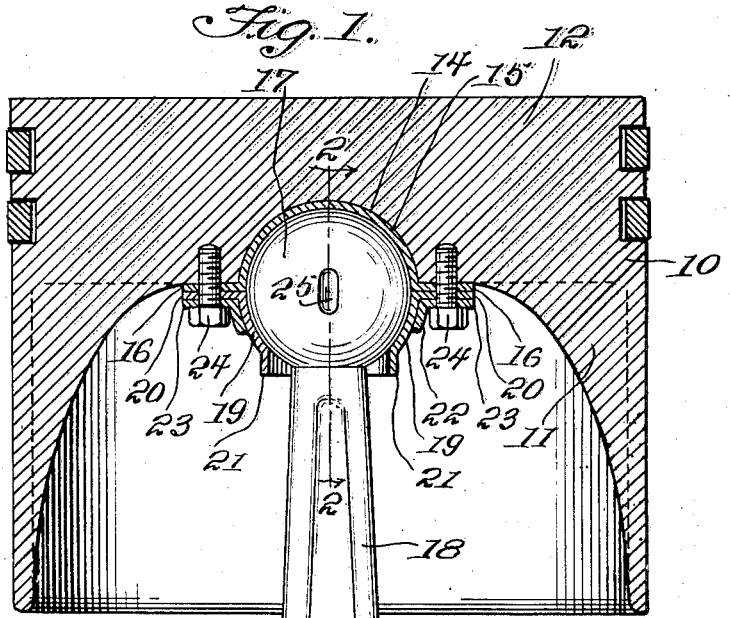
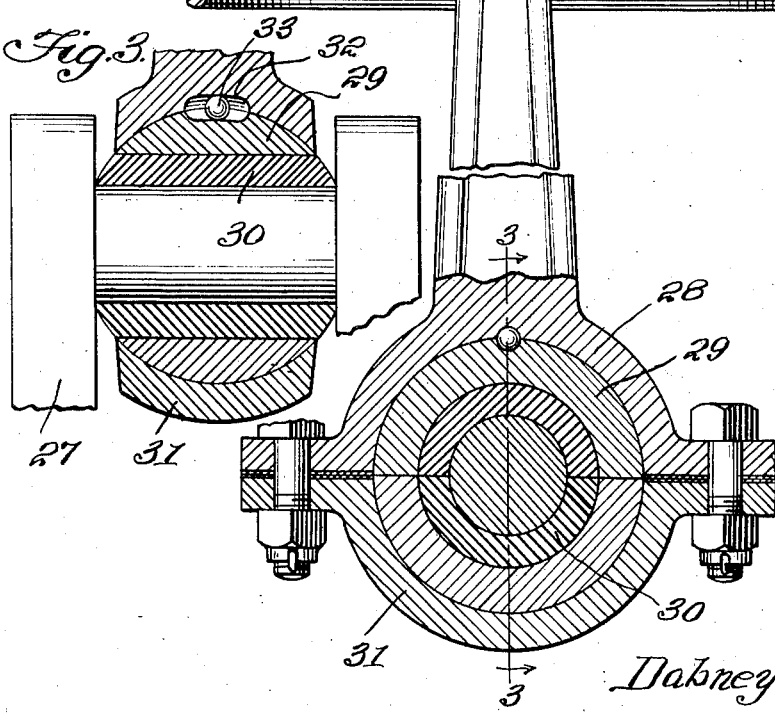
Dabney P. Owens,
INVENTOR
BY Victor J. Evans
ATTORNEY
WITNESS Dec. 28, 1926.  
D. P. OWENS  
1,612,047  
PISTON MOUNTING  
Filed Sept. 25, 1925   2 Sheets-Sheet 2
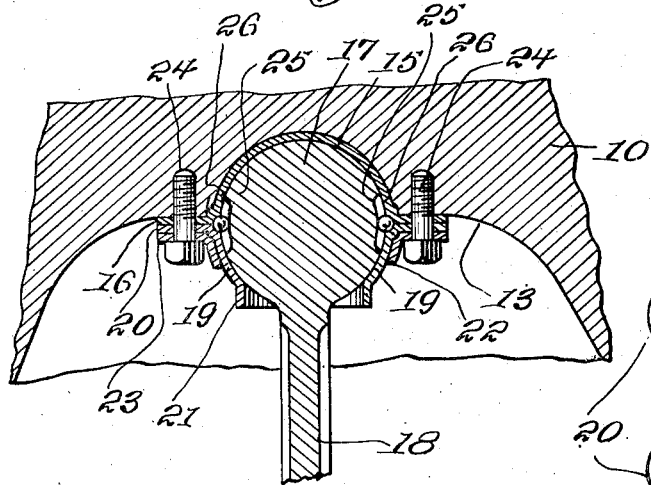
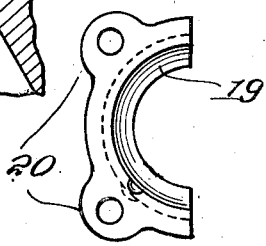
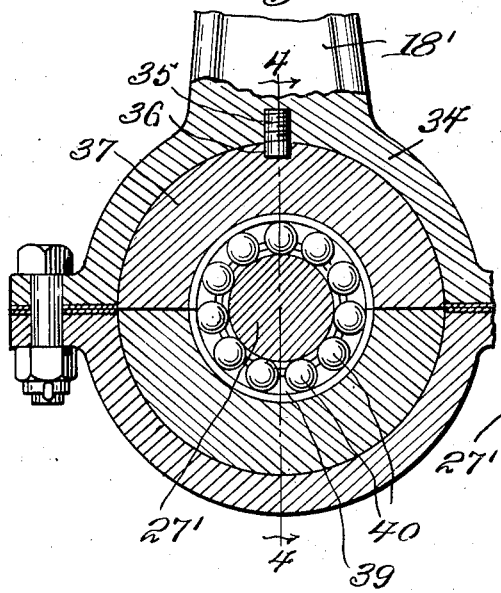
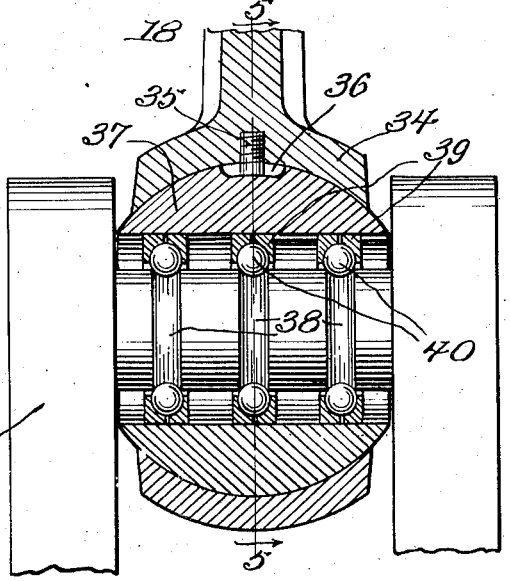
Dabney P. Owens
INVENTOR
BY Victor J. Evans
ATTORNEY
WITNESS: J. O. L. Wright Patented Dec. 28, 1926.

1,612,047

UNITED STATES PATENT OFFICE.

DABNEY P. OWENS, OF LAKE WORTH, FLORIDA.

PISTON MOUNTING.

Application filed September 25, 1925. Serial No. 58,622.

My invention has reference to engines, primarily of the internal combustion type, and is particularly directed to the pistons and the mounting for such pistons of an engine.

A further object is the provision of a mount between a piston and the operating crank shaft therefor, of a construction whereby the piston will, under all conditions be caused to reciprocate in a straight line in the cylinder, and thereby obviating the liability of the canting or tilting of the piston and the consequent damage to the piston and to the walls of the cylinder resulting therefrom.

A still further object is to produce a piston and a mount therefor in which the employment of the ordinary wrist pins is dispensed with and in which a ball and socket connection between the piston and the connecting rod is provided, the construction being such as to permit of a free swinging of the connecting rod on the piston in the direction of the turning of the crank shaft, but which will prevent the rotary turning of the piston on the rod, whereby a direct reciprocation of the piston free from contact with the walls of the cylinder is insured.

A still further object is the provision of a novel construction of pistons having a socket arranged centrally in the inner face thereof for the reception of the ball head of a connecting rod, means being provided for holding the ball head in the socket, and means being further provided for limiting the longitudinal swinging of the connecting rod which does not interfere with the free lateral swinging of the said rod, and further wherein the rod is mounted upon the crank shaft in a manner to permit its movement in coordination with the end play of the said crank shaft so that the proper movement of the piston in the cylinder will not be impaired by such movement of the crank shaft, and further wherein the friction between the connected parts is reduced to a minimum.

To the attainment of the above recited objects and others which will appear as the nature of the invention is better understood, the improvement consists in the construction, combination and operative association of parts, a satisfactory embodiment of which is illustrated by the accompanying drawings.

In the drawings:

Figure 1 is an approximately central vertical sectional view through the improvement.

Figure 2 is a sectional view on the line 2—2 of Figure 1.

Figure 3 is a sectional view on the line 3—3 of Figure 1.

Figure 4 is a sectional view approximately on the line 4—4 of Figure 5, and illustrating a slight modification.

Figure 5 is a sectional view on the line 5—5 of Figure 4.

Figure 6 is a top plan view of one of the outer socket sections.

The piston 10 differs from the ordinary construction inasmuch as the same is materially less in length and the outer head portion thereof is of greater thickness than the ordinary piston. The piston is hollow from its inner end to its head, but the side walls provided by the hollow portion are reinforced by ribs 11, which, of course, are also formed with a head. For distinction the head is indicated by the numeral 12 and the same is provided with spaced peripheral grooves for the reception of the usual piston rings.

For distinction the inner wall of the head 12 is indicated by the numeral 13 and this wall is centrally formed with a semi-spherical depression 14. In the depression 14 there is seated a hollow semi-spherical socket member 15. The member 15 has its edge formed with outwardly directed ears 16 that rest directly against the wall 13. The socket section 15 is of steel or other hardened metal and is designed to receive therein a ball head 17 formed on one end of a connecting rod 18. To hold the ball head 17 in the socket member 15 I employ outer socket members or sections 19. These socket sections are semi-cylindrical in plan and have their body portions dished for engagement with the ball head 17. The outer or top edge of the sections 19 is formed with ears 20 to align with the ears 16. The opening or mouth end of the socket sections 9 and 10 are disposed a suitable distance away from the connecting rod 18 and are preferably formed with depending flanges 21. To hold the inner and outer socket members associated for the reception of the ball head 17 therein, I provide an annulus which may be constructed of sections and which has its body portion 22 dished for contacting engagement with the rounded body portions of the sections 19.

The outer edge of the annulus 22 is formed with ears 23 which underlie the ears 20, and passing through aligning openings in the lapping ears there are bolts 24 which are screwed in the head 12.

Two of the opposite sides of the head 17 are provided with vertically disposed slightly elongated depressions 25. These depressions are designed to receive therein anti-frictional elements preferably in the nature of spheres 26 which are housed in the socket member 15. The purpose of this arrangement will presently be apparent. The crank shaft for the engine is indicated by the numeral 27. The outer end of the connecting rod 18 is widened and concaved in the usual manner and the ends thereof are formed with outstanding ears. The forked or arched end 28 of the connecting rod is arranged over the straight portion of the crank shaft in the usual manner, but in the present instance the arched end 28 of the connecting rod has its inner face concaved for the reception of the convex outer surface of a ring member 29. The inner face of the ring member is flat and is in contact with a Babbitt or other anti-frictional lining 30 on the said straight portion of the crank shaft. The ring member 29 and the Babbitt or other anti-frictional lining 30 is constructed of two sections as disclosed by Figure 1 of the drawings and the ring member 29 is received in the concaved wall on the inner arched face of the removable or connecting section 31 for the connecting rod 18. The section 31 is provided with the usual outstanding ears disposed for contacting engagement with the ears of the connecting rod and the usual nuts and bolts hold the section 31 on the connecting rod. It is to be noted that the depressions or pockets 25 in the head 17, for the anti-frictional elements 26, are disposed right angularly with respect to the longitudinal plane of the crank shaft 27, and by reference to Figure 3 of the drawings it will be noted that the arched end 28 of the rod 18 and the convex face of the ring member 29 are provided with aligning depressions 32 which are arranged in the same plane as the crank shaft. These depressions provide a pocket for a stop element 33. The element 33 may and preferably is in the nature of a ball or sphere. With a construction as just described it will be apparent that any longitudinal movement or end play of the crank shaft will simply cant or tilt the connecting rod 18 on its bearings without any tendency of canting or tilting the piston 10 and that any turning or rotary movement of the piston on the piston rod will be prevented. Thus it will be noted that a proper and true longitudinal movement of the piston through the engine cylinder is insured regardless of any longitudinal movement or end play of the crank shaft.

In Figures 4 and 5 of the drawings there has been illustrated a slight modification. The arched and concaved end 34 of the connecting rod 18' has centrally let therein a pin 35. This pin plays in a slot 36 in the convex face of the ring member 37. The straight portion of the crank shaft 27' is provided with a series of continuous grooves 38, and a bearing member or ring 39 which is arranged in the ring member 37 and around the said straight portion of the crank shaft 27' is provided with cages for antifrictional spheres 40 which are received in the grooves 38.

In both constructions of the improvement it will be noted that the wear between parts is reduced to a minimum. The improvement dispenses with the employment of the wrist pins which provide the connection between the rods and the pistons, eliminates piston slaps and the distortion of the piston or the cylinder in which it works through the liability of canting or the tilting of the said piston when in the cylinder.

The simplicity of the construction and the advantages thereof will, it is thought be perfectly apparent to those skilled in the art to which the invention relates when the foregoing description is read in connection with the accompanying drawings, but it is, of course, to be understood that I do not wish to be restricted to the precise details of construction herein set forth and may make such changes therefrom as fairly fall within the scope of what I claim.

Having described the invention, I claim:—

1. In an internal combustion engine, the combination, a piston, having an open end terminating in a straight wall which is formed with a socket, a hollow spherical member movably arranged in the socket, projecting therebeyond and secured to the piston, a rod having a ball end received in the socket, said ball head having depressions in the faces thereof arranged in the longitudinal plane of the crank shaft, anti-frictional elements carried by the socket and received in the depressions, and means connecting the second end of the rod to the crank shaft permitting a turning of the rod on the said shaft when the crank shaft is subjected to or susceptible of end thrust, as and for the purpose set forth.

2. In an internal combustion engine, the combination, a piston and a crank shaft, said piston having a thick head and a depending skirt, internal reinforcing ribs between the head and skirt, said head having its under face provided with a central semi-spherical depression, a hollow semi-spherical socket member received in the depression and projecting therefrom, means removably securing the socket in the depression and fixing the same on the piston, and said socket and said means being constructed of sections, a piston rod having a ball head received in the socket and having the sides of its heads arranged in the longitudinal plane of the shaft provided with somewhat elongated depressions, anti-frictional elements carried by the socket and received in the depressions to provide a pivotal connection between the head and socket, a connection between the second end of the rod and the crank shaft, including a ring member, an anti-frictional bearing on the crank shaft contacting the ring member, said ring member having its outer face rounded, and the said end of the rod being concaved to receive the rounded face of the ring therein, the confronting faces of the ring and end of the rod having aligning depressions and a stop element in said depressions, for the purpose set forth.

In testimony whereof I affix my signature.

DABNEY P. OWENS.